(12) United States Patent
Suzuki et al.

(10) Patent No.: US 7,273,032 B2
(45) Date of Patent: Sep. 25, 2007

(54) ENGINE INDUCTION SYSTEM

(75) Inventors: Yuichi Suzuki, Iwata (JP); Kenichi Sakurai, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 11/160,050

(22) Filed: Jun. 7, 2005

(65) Prior Publication Data

US 2005/0274354 A1 Dec. 15, 2005

(30) Foreign Application Priority Data

Jun. 14, 2004 (JP) ............................. 2004-175226

(51) Int. Cl.
*F02B 31/08* (2006.01)
(52) U.S. Cl. ...................... 123/308; 123/432
(58) Field of Classification Search ............... 123/301, 123/302, 308, 432
See application file for complete search history.

(56) References Cited

U.S. PATENT DOCUMENTS

| 4,313,410 A | 2/1982 | Kunii et al. |
| 4,344,396 A | 8/1982 | Yamada |
| 4,438,743 A * | 3/1984 | Namba et al. ............... 123/308 |
| 4,530,325 A | 7/1985 | Namba et al. |
| 4,550,699 A * | 11/1985 | Okumura et al. ........... 123/308 |
| 5,165,374 A | 11/1992 | Chapman et al. |
| 5,417,190 A * | 5/1995 | Ando et al. ................. 123/308 |
| 5,765,525 A | 6/1998 | Ma |
| 5,960,759 A * | 10/1999 | Ohsuga et al. ............... 123/308 |
| 6,092,503 A * | 7/2000 | Ohsuga et al. ............... 123/308 |
| 6,427,659 B2 * | 8/2002 | Shiraishi et al. ............. 123/308 |
| 6,443,124 B2 * | 9/2002 | Yamaguchi et al. ........ 123/308 |
| 6,634,333 B2 * | 10/2003 | Fujieda et al. ............... 123/308 |

FOREIGN PATENT DOCUMENTS

| JP | 58-135322 | * | 8/1983 | ................. 123/308 |
| JP | 05-26135 | | 2/1993 | |
| JP | 5-86873 | * | 4/1993 | ................. 123/308 |

* cited by examiner

*Primary Examiner*—T. M. Argenbright
(74) *Attorney, Agent, or Firm*—Ernest A Beutler

(57) ABSTRACT

An induction system for a multi valve engine that facilitates operation in a lean burn mode over a large range of speeds and loads by employing a smaller cross sectional branch passages in several induction passages serving a common combustion chamber and a valve arrangement that progressively opens flow first through the branch passages and finally through both the main and branch passages so that maximum power can also be obtained.

10 Claims, 2 Drawing Sheets

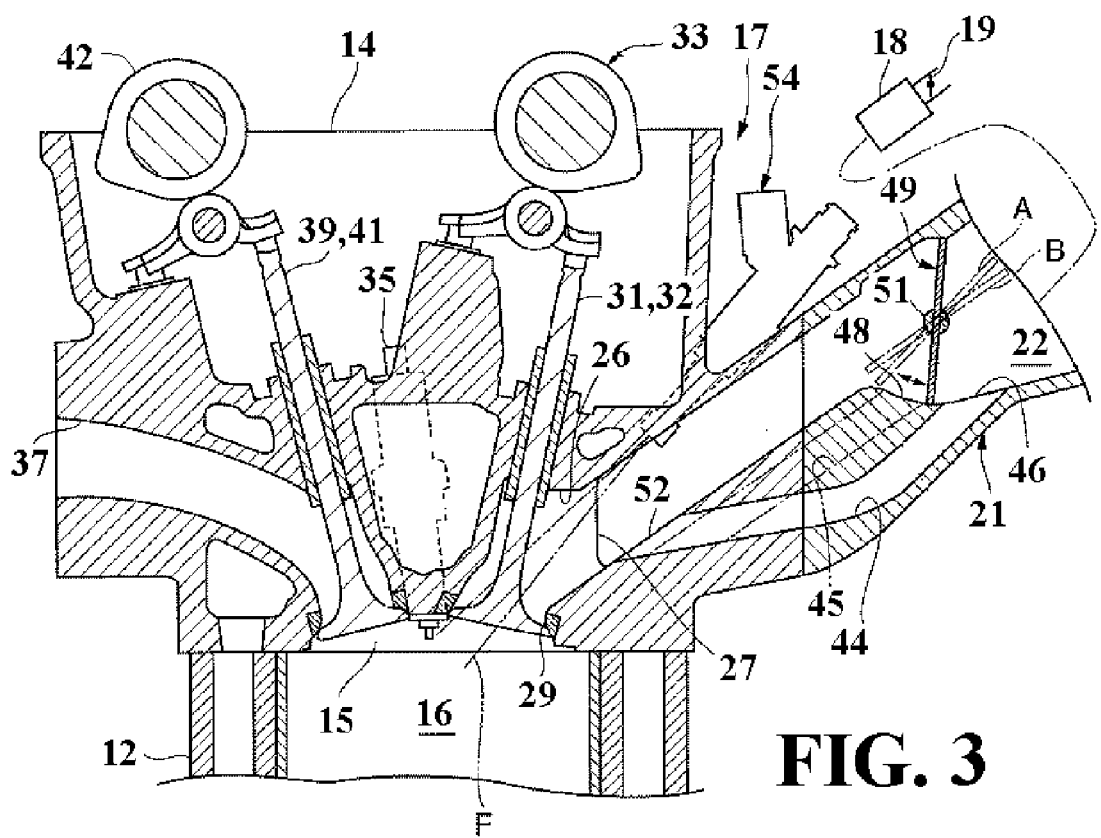
FIG. 3
FIG. 4
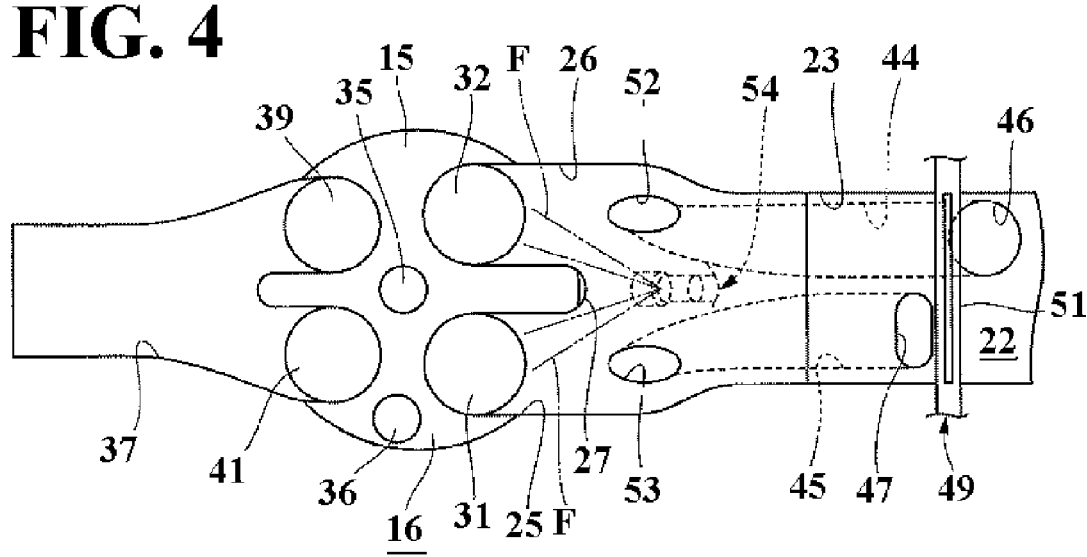

ENGINE INDUCTION SYSTEM

BACKGROUND OF THE INVENTION

This invention relates to an internal combustion engine and more particularly to an improved induction system for such an engine having improve performance particularly at low and mid range speeds without adversely affecting high speed performance.

It is well known that the induction system for an engine is a compromise between the obtaining of maximum performance and good running and fuel consumption at low speeds. It has also been proposed to provide an induction system induces turbulence in the combustion chamber in the form of swirl or tumble to improve low speed running and particularly to permit lean combustion. Examples of this are shown in U.S. Pat. No. 5,671,712 and Japanese Published Application 05-026135.

In the noted the United States Patent, the induction system includes a control valve which controls the flow of air to three intake valves provided for each combustion chamber. At low speeds, the control valve is operated so that the flow is directed through a restricted passageway toward one of the side intake valves. This also directs the flow into the combustion chamber in a direction of the to improve tumble and/or swirl. However, the flow also tends to go toward the other intake valves and diminishes the overall effect.

In the Japanese publication, on the other hand, the intake system cooperates with two intake valves and is designed so as to promote an increased flow to one of the intake valves by restricting the flow area. This will generate some turbulence. However, the arrangement restricts the overall ability of the engine to breath and thus reduces high speed performance.

In addition to the noted problems, in each approach in addition to the higher velocity flow through the restricted passage there is still a slower flow through the remainder of the valve opening through which the restricted opening passes. Thus even this added turbulence is reduced.

It is therefor a principal object to this invention to provide an induction system for an engine that will produce turbulence when desired and the desired flow directions without restricting maximum power output. In addition when the turbulence is generated this is done in such a way as to maintain the air flow in the direction or directions desired in the combustion chamber without dissipation of the effect.

SUMMARY OF THE INVENTION

A feature of this invention is adapted to be embodied in an internal combustion engine comprised of a pair of relatively moveable components defining a combustion chamber that varies in volume cyclically as the components move. A pair of intake passages supply of at least an air charge to the combustion chamber through respective valved openings communicating with the combustion chamber. A throttle valve is positioned in a common inlet to the intake passages for controlling the air flow thereto. A branch passage is formed in each of the intake passages and has an upstream inlet opening in communication with the common inlet and a discharge opening communicating directly with the valved opening of the respective intake passage in a direction to induce a swirling motion in the air delivered to the combustion chamber from the respective branch passage. A control valve precludes the flow through one of the branch passages when in a first position and permits flow through both of the branch passages in a second position.

BRIEF DESCRIPTION OF THE DRAWING

FIG. 3 is a cross sectional view, in part similar to FIG. 1, and shows a second embodiment of the invention.

FIG. 4 is a cross section of view, in part similar to FIG. 2, and shows the construction of the embodiment of FIG. 3.

DETAILED DESCRIPTION

Figure 1:
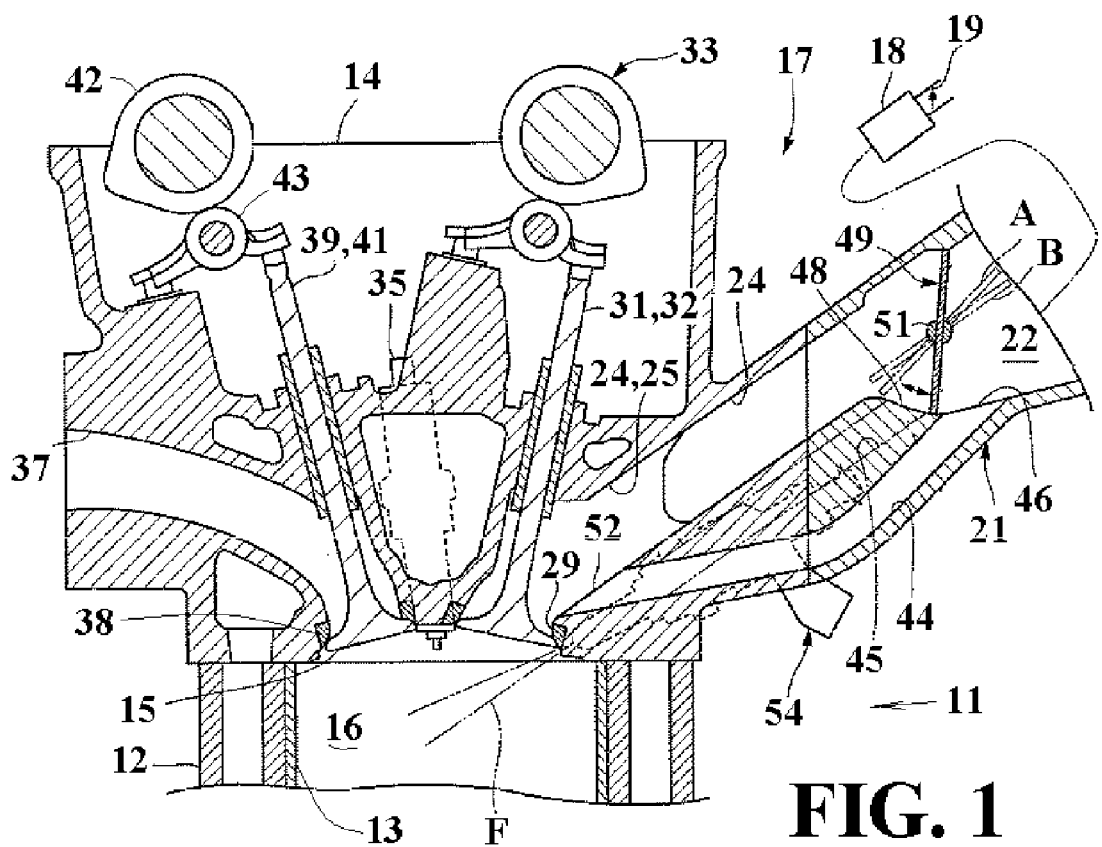
FIG. 1 is a partial cross sectional view take through a single cylinder of an internal combustion engine constructed in accordance with a first embodiment of the invention.
Figure 2:
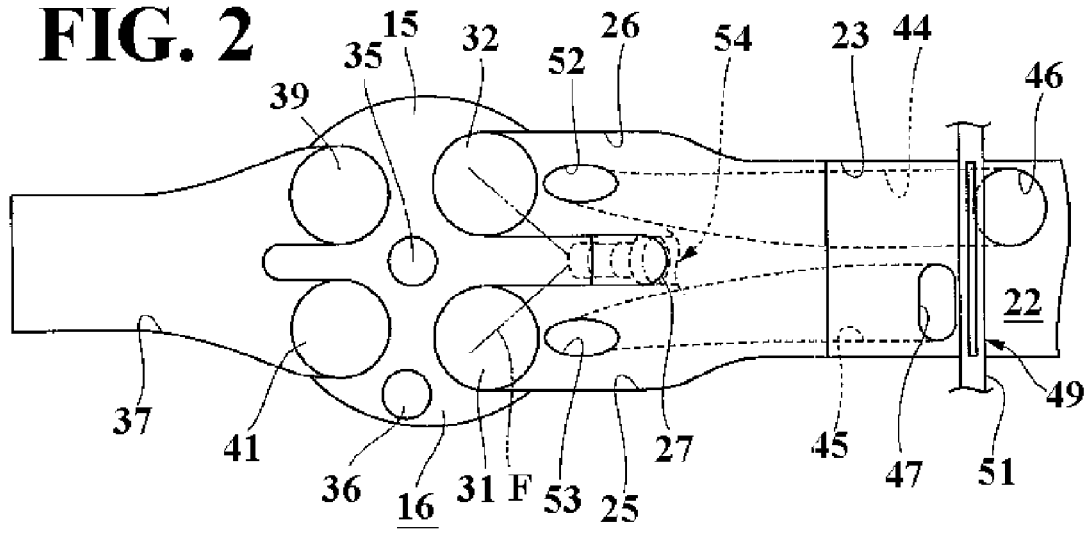
FIG. 2 is a cross section view taken along a plane perpendicular to the plane of FIG. 1 looking from below and shows the configuration the induction system and its relation to an associated combustion chamber

Referring and now in detail to the drawing and initially to the embodiment of FIGS. 1 and 2, these show a portion of an internal combustion engine constructed in accordance with a first embodiment of the invention. In this embodiment and the other embodiment of FIGS. 3 and 4 to be describes shortly, only a portion of the engine, identified generally by the reference numeral 11, is illustrated. The portion of the engine that is shown is the combustion chamber and the induction and exhaust systems associated with it. The complete engine is not shown in as much as those skilled in the art will readily understand from the following description how the invention can be practiced with engines having any desired number of cylinders and cylinder configuration.

The engine 11 is comprised of the a cylinder block 12 that forms one or more cylinder bores 13 in which pistons (not shown) are supported for reciprocation. As is well known in the art, these pistons are connected to a crankshaft by means of connecting rods (none of which are shown). The cylinder bores 13 are closed at their upper ends by means of one or more cylinder head assemblies 14, depending upon the configuration of the engine. That is, if the engine is of the V or opposed type, there will be provided a cylinder head 14 for each bank of the cylinder block 12.

The surface of the cylinder head 14 that closes the cylinder bore 13 is formed with a recess 15. These recesses 15. the cylinder bores 13 and the head of the pistons each form a combustion chamber, indicated at 16, of volume that varies cyclically as the engine crankshaft rotates. The combustion chamber is supplied with an air charge of by an induction system indicated generally at 17. This induction system includes an air inlet device 18 that communicates with the atmosphere through an air intake opening in which a butterfly type operator control throttle valve 19 is positional. The induction device 18 may include tuning and silencing arrangements and so on of any desired types.

Since a single combustion chamber 16 is shown it should be understood the induction device 18 may form a part of an intake manifold that has branch sections or runners that communicate with the individual combustion chambers 16. As illustrated these branch selections or runners have portions, indicated generally by the reference numeral 21 that sealingly engaged with the outer surface of the cylinder head 14.

The manifold runner 21 as a generally open passageway, indicated generally by the reference numeral 22, terminating in a large discharge opening 23 that communicates with a common inlet opening, indicated generally at 24, of a cylinder head intake passage. The cylinder head intake passage is Siamesed and a pair of branch passages 25 and 26, separated by a wall 27 extend from the common inlet 24.

Each intake passage branch 25 and 26 terminates at a respective valve seat 28 and 29, respectively, formed in the cylinder head recess 15. Poppet type intake valves 31 and 32 are slidably supported in any desired manner by the cylinder head 14 and control the opening and closing of the these valve seats 28 and 29. These intake valves 31 and 32 are operated by an overhead mounted cam shaft 33 journalled in the cylinder head 14. Any suitable operating mechanism may be provided such as the rocker follower type of arrangement shown in the figures and indicated by the reference numeral 34.

The charge which is formed in the combustion chambers 16, in a manner to be described, is fired by means of a pair of spark plugs 35 and 36. The spark plug 35 is mounted centrally in the combustion chamber 16 while the spark plug 36 is mounted adjacent the valved seat 29 adjacent the periphery of the cylinder bore 13.

The burn charge is discharged from the combustion chamber 16 through a pair of a Siamese exhaust passage 37 which originates from exhaust valve seats 38 and 41 and is discharged to the atmosphere through a suitable exhaust system (not shown). Like the intake valves 31 and 32, poppet type exhaust valves 39 and 41 are slidably supported in the cylinder head 14 in a suitable manner and are operated by means of an exhaust cam shaft 42, suitably journalled in the cylinder head 14, through a suitable mechanism such as rocker followers 43.

Each intake valve seat 28 and 29 is served by a respective branch passage 44 and 45. These branch passages 44 and 45 have respective inlet openings 46 and 47 that are formed in a curved surfaces 48 at the outlet end of the manifold runner end 21. The curved surface 48 is complementary in shape to the peripheral edge of a butterfly type control valve 49 that is journalled on a control valve shaft 51 that extends transversely across the manifold runner end 21.

The branch passages 44 and 45 extend also through the cylinder head 14 and terminate in respective discharge openings 52 and 53 that are directed transversely across the valve seats 28 and 29 and directed toward the opposite side thereof.

This embodiment employs direct cylinder fuel injection. To this end, a fuel injector 54 is mounted in the cylinder head 14 in the area adjacent the dividing wall 27 and below it. This fuel injector 54 has a spray pattern indicated by the broken lines F in the figures. The fuel sprayed from the fuel injector 54 will pass from one side of the cylinder bore 14 toward the opposite side and in proximity to the intake valve seats 28 and 29.

The operation of this embodiment will now be described. It should be noted that regardless of the position of the flow control valve 49, the A inlet opening 46 of the passage branch passage 44 will always be open. Thus, when the engine is operating at idle, all of the air flow will pass into the combustion chamber through the passageway 44 and specifically its opening 52. As may be seen from FIG. 2, this is in direct registry with part of the discharge of fuel from the injector 54. Also as has been noted, the discharge of opening 52 is directed toward the side of the of valve seat 29 closer to the axes of the cylinder bore 14. Thus, this fuel will be subjected to a high velocity swirling motion around the axes of a cylinder bore 14 and ignition least by the spark plug 36 will be insured even though there is only a small amount of fuel in the combustion chamber 16.

It should be understood back the flow control valve 49 may be operated either through a sequence through a linkage system with the operator control throttle valved 14 or maybe operated by means of a sensor of engine conditions such as engines speed/and or load. The condition described in the previous paragraph is the condition when operating at idle.

As the operator demands greater power by opening the throttle valved 19, the flow control valve 49 is open progressively as shown by the arrows in FIG. 1 from the position indicated in solid lines, toward the position indicated at A. When this position is reached, inlet opening 47 of the branch passage 46 associated with the intake valve 32 will be opened. As a result of this, there will be a high velocity air flows through both of the branch passages 45 and 46 and these flows will cause a tumble operation to occur in the combustion chamber 16. In addition, the fuel be well mixed and can be ignited by either or both of the spark plugs 35 and 36. Thus, even in mid range performance, lean operation is possible to improve fuel economy and good exhaust emission control.

In the embodiment as thus far described, the fuel injector 54 has been positioned to inject directly into the combustion chamber 16 resulting in what is referred to as "direct injection". However, the invention also may be employed in conjunction with manifold type fuel injection and such an embodiment is shown in FIGS. 3 and 4. In this embodiment, the only difference from the previously described embodiment is in conjunction with the location of the fuel injector 54. Therefore, where components are the same as those in the previously described embodiment they have been identified by the same reference numerals and will be described again only in so far as is necessary to understand the construction and operation of this embodiment.

Referring now specifically to this embodiment it will be seen that the fuel injector 54 is mounted in the upper portion of the cylinder head 14 above the intake passages 25 and 26. Actually, the actually the injector 54 is positioned upstream of the dividing wall 27 so that it's spray, I indicated by the arrows F., will be directed toward discharge openings 52 and 53 of the branch passages 25 and 26. The discharge is, however, downstream of the branch passage openings 52 and 53 so that these same motion will be generated in the combustion chamber 16. That is, when operating at idle, fuel will be discharged into the combustion chamber 16 due to the opening of both of the intake valves 31 and 32 and all of the air will introduced through both of the branch passage discharge openings 52 and 53 to provide the same form of motions in combustion chamber 16 has already described.

Also, the operation at part throttle and full throttle will also will be as previously described. Thus it is not believed necessary to repeat this description again. Of course, it should be understood that the foregoing description is that of some specific embodiments of the invention. Those skilled in the art will, however, understand readily than the spirit and scope and invention is not limited to specific environments described and that various modifications may be made without departing from the spirit and scope of the invention, as defined by the appended claims.

What is claimed is:

1. An internal combustion engine comprised of a pair of relatively moveable components defining combustion chamber that varies in volume cyclically as said components move, a pair of intake passages for supplying at least an air charge to said combustion chamber through respective valved openings communicating with said combustion chamber, a throttle valve in a common inlet to said intake passages controlling the air flow thereto, a pair of branch passage each formed in a respective one of said intake passages having an upstream inlet opening in communication with said common inlet and a discharge opening communicating directly with the valved opening of the respective of said intake passages in a direction to induce a swirling motion in the air delivered to said combustion chamber from said branch passages, and a control valve for precluding the flow through one of said branch passages when in a first position and permitting flow through both of said branch passages in a second position, said control valve comprising a butterfly valve supported for rotation about an axis extending transversely across said common inlet downstream of said throttle valve.

2. An internal combustion engine as set forth in claim 1 wherein the one branch passage is always in communication with the common inlet and the other branch passage communicates only with the common inlet when the control valve is opened more than a predetermined amount.

3. An internal combustion engine as set forth in claim 1 wherein the common inlet has a wall section that has a curved surface with its center coincident with the axis of the control valve shaft and of a radius substantially equal to that of the control valve.

4. An internal combustion engine as set forth in claim 3 wherein the branch passages open through the curved surface.

5. An internal combustion engine as set forth in claim 4 further including a fuel injector for injecting fuel in a direction to be exposed to the air flow through at least one of the branch passages.

6. An internal combustion engine as set forth in claim 5 wherein the fuel injector injects the fuel directly into the combustion chamber.

7. An internal combustion engine as set forth in claim 5 wherein the fuel injector injects the fuel into at least one of the intake passages.

8. An internal combustion engine as set forth in claim 7 wherein the fuel injector injects the fuel into both of the intake passages.

9. An internal combustion engine as set forth in claim 8 wherein the fuel injector injects the fuel toward the discharge openings of the branch passages.

10. An internal combustion engine as set forth in claim 9 wherein the fuel injector injects the fuel into the common inlet and transversely across the discharge openings of the branch passages.

* * * * *